(12) United States Patent
Chung et al.

(10) Patent No.: US 9,625,035 B2
(45) Date of Patent: Apr. 18, 2017

(54) METHOD OF CONTROLLING A GEAR RATIO OF A TRANSMISSION

(71) Applicant: GM GLOBAL TECHNOLOGY OPERATIONS LLC, Detriot, MI (US)

(72) Inventors: Woowon Chung, Ypsilanti, MI (US); Jeryl McIver, Inkster, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 14/856,085

(22) Filed: Sep. 16, 2015

(65) Prior Publication Data

US 2017/0074396 A1 Mar. 16, 2017

(51) Int. Cl.
*F16H 61/66* (2006.01)
*F16H 61/00* (2006.01)
*B60W 10/101* (2012.01)

(52) U.S. Cl.
CPC ........... *F16H 61/66* (2013.01); *B60W 10/101* (2013.01); *B60W 2540/106* (2013.01); *F16H 2061/009* (2013.01); *F16H 2061/0096* (2013.01)

(58) Field of Classification Search
CPC ............. F16H 61/66; F16H 2061/0096; F16H 2061/009; B60W 10/101; B60W 2540/106
USPC ............................................ 701/57, 61, 66
See application file for complete search history.

(56) References Cited

U.S. PATENT DOCUMENTS

| | | | |
|---|---|---|---|
| 5,101,350 A * | 3/1992 | Tokoro | F16H 61/0213 477/78 |
| 7,831,365 B2 | 11/2010 | Herbster et al. | |
| 8,133,154 B2 | 3/2012 | Tao et al. | |
| 8,775,041 B2 | 7/2014 | Kresse et al. | |
| 2008/0262684 A1 * | 10/2008 | Taffin | F16H 61/0213 701/57 |
| 2009/0043471 A1 * | 2/2009 | Ly | B60W 10/06 701/70 |
| 2015/0152962 A1 * | 6/2015 | Ajimoto | F16H 61/6648 477/37 |

* cited by examiner

Primary Examiner — Roger Pang
(74) Attorney, Agent, or Firm — Quinn IP Law

(57) ABSTRACT

A method of controlling a transmission includes detecting a first inflection point and a second inflection point in the movement of the accelerator pedal. An amplitude between the first inflection point and the second inflection point is then calculated, and a period of time between the first inflection point and the second inflection point is measured. An attenuation coefficient is defined from the amplitude and the measured period of time between the first and second inflection points. A current iteration temporary gear ratio is defined as the gear ratio calculated during the most recent iteration of an iterative gear ratio selection algorithm, and is adjusted with the defined attenuation coefficient to define a current iteration final output gear ratio. The operation of the transmission is then controlled to change the transmission from a previous iteration final output gear ratio to the current iteration final output gear ratio.

17 Claims, 2 Drawing Sheets

| | 10 | 60 | 110 | 160 | 210 | 300 | 700 | 1160 |
|---|---|---|---|---|---|---|---|---|
| 20 | 1 | 1 | 1 | 1 | 1 | 1 | 1 | 1 |
| 30 | 0.9 | 0.9 | 1 | 1 | 1 | 1 | 1 | 1 |
| 40 | 0.8 | 0.8 | 0.9 | 1 | 1 | 1 | 1 | 1 |
| 50 | 0.7 | 0.7 | 0.8 | 0.9 | 0.9 | 1 | 1 | 1 |
| 60 | 0.6 | 0.6 | 0.7 | 0.7 | 0.8 | 0.9 | 1 | 1 |
| 70 | 0.5 | 0.6 | 0.7 | 0.7 | 0.8 | 0.9 | 1 | 1 |
| 80 | 0.4 | 0.6 | 0.7 | 0.8 | 0.9 | 0.9 | 1 | 1 |
| 90 | 0.3 | 0.5 | 0.7 | 0.8 | 0.8 | 0.9 | 1 | 1 |
| 100 | 0.2 | 0.4 | 0.7 | 0.8 | 1 | 1 | 1 | 1 |
| -100 | 0.4 | 0.5 | 0.6 | 0.6 | 0.7 | 0.5 | 0.5 | 1 |
| -90 | 0.5 | 0.5 | 0.5 | 0.5 | 0.5 | 0.5 | 0.5 | 1 |
| -80 | 0.5 | 0.5 | 0.6 | 0.6 | 0.7 | 0.8 | 0.9 | 1 |
| -70 | 0.6 | 0.6 | 0.7 | 0.9 | 0.9 | 0.9 | 1 | 1 |
| -60 | 0.6 | 0.6 | 0.7 | 0.7 | 0.8 | 0.9 | 1 | 1 |
| -50 | 0.7 | 0.7 | 0.7 | 0.7 | 0.8 | 0.9 | 1 | 1 |
| -40 | 0.7 | 0.7 | 0.7 | 0.8 | 0.9 | 0.9 | 1 | 1 |
| -30 | 0.9 | 0.9 | 0.9 | 0.8 | 0.8 | 1 | 1 | 1 |
| -20 | 0.9 | 0.9 | 1 | 1 | 1 | 1 | 1 | 1 |

FIG. 2

METHOD OF CONTROLLING A GEAR RATIO OF A TRANSMISSION

TECHNICAL FIELD

The disclosure generally relates to a method of controlling a transmission of a vehicle.

BACKGROUND

Vehicular transmissions change gear ratios to satisfy current driving conditions. A Continuously Variable Transmission (CVT) seamlessly changes through an infinite number of effective gear ratios, between maximum and minimum values. This contrasts with other mechanical transmissions that offer a fixed number of gear ratios. When a vehicle is equipped with a CVT, frequent and quick changes in the movement of the accelerator pedal may result in unnecessary or excessive changes in the gear ratio of the CVT.

SUMMARY

A method of controlling a transmission of a vehicle is provided. The method includes continuously sensing a position of an accelerator pedal over time, with a position sensor. The position of the accelerator pedal is sensed to detect a first inflection point and a second inflection point in the movement of the accelerator pedal. An amplitude between the first inflection point and the second inflection point is then calculated. A period of time is measured between the occurrence of the first inflection point and the occurrence of the second inflection point. An attenuation coefficient is defined from the calculated amplitude and the measured period of time. A current iteration temporary gear ratio for the transmission is defined with an iterative gear ratio selection algorithm, in which the gear ratio calculated during the most recent iteration of the gear ratio selection algorithm is defined as the current iteration temporary gear ratio. The current iteration temporary gear ratio is adjusted with the defined attenuation coefficient to define a current iteration final output gear ratio. The operation of the transmission is then controlled to change the transmission from a previous iteration final output gear ratio to the current iteration final output gear ratio. The previous iteration final output gear ratio is the gear ratio calculated during the immediately previous iteration of the gear ratio selection algorithm.

A method of controlling a continuously variable transmission of a vehicle is also provided. The method includes continuously sensing a position of an accelerator pedal over time. The position of the accelerator pedal is sensed with a position sensor, to detect a first inflection point and a second inflection point in the movement of the accelerator pedal. An inflection point is defined as a change in direction in the movement of the accelerator pedal. An amplitude between the first inflection point and the second inflection point is calculated with a Transmission Control Unit (TCU). A period of time between an occurrence of the first inflection point and an occurrence of the second inflection point is measured, with a clock of the TCU. An attenuation coefficient is defined from the calculated amplitude and the measured period of time with the TCU. A current iteration temporary gear ratio for the transmission is defined with the TCU. The current iteration temporary gear ratio is defined with an iterative gear ratio selection algorithm, in which the gear ratio calculated during the most recent iteration of the gear ratio selection algorithm is defined as the current iteration temporary gear ratio. A previous iteration final output gear ratio is defined with the TCU. The previous iteration final output gear ratio is defined with the iterative gear ratio selection algorithm, in which the gear ratio calculated during the immediately previous iteration of the gear ratio selection algorithm is defined as the previous iteration final output gear ratio. A current iteration final output gear ratio is calculated with the TCU from the Equation:

$$GR_{CIFO} = GP_{PIFO} + [K_{Att} \times (GR_{CIT} - GR_{PIFO})]$$

wherein $GR_{CIFO}$ is the current iteration final output gear ratio of the transmission, $GR_{PIFO}$ is the gear ratio calculated from the most recent iteration of the iterative gear ratio selection algorithm (i.e., the current iteration temporary gear ratio), $K_{Att}$ is the attenuation coefficient, and $GR_{PIFO}$ is the gear ratio calculated from the immediately previous iteration of the iterative gear ratio selection algorithm (i.e., the previous iteration final output gear ratio). The operation of the transmission is then controlled with the TCU to change the transmission from the previous iteration final output gear ratio to the current iteration final output gear ratio.

Accordingly, the TCU may adjust the current iteration temporary gear ratio based on the magnitude or difference between the first inflection point and the second inflection point, and the time period between the occurrence of the first inflection point and the occurrence of second inflection point. In so doing, excessive and unnecessary changes in the gear ratio of the continuously variable transmission may be mitigated under these conditions.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is an exemplary embodiment of a look-up table for an attenuation coefficient.

DETAILED DESCRIPTION

Figure 1:
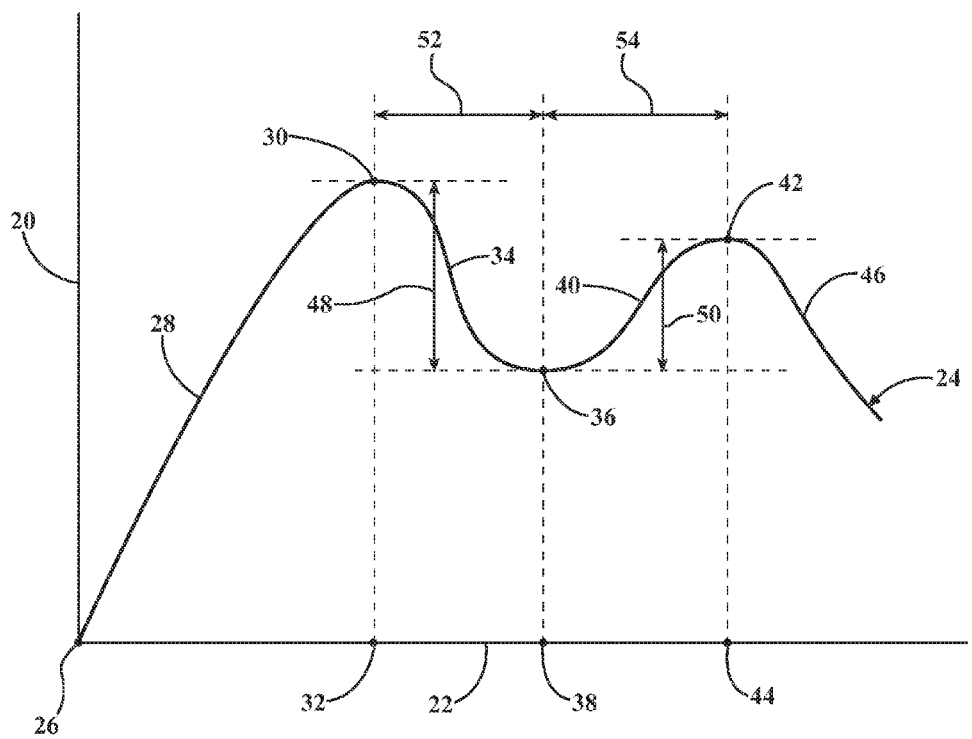
FIG. 1 is a graph representing a position of an accelerator pedal over time.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a method of controlling a transmission of a vehicle is described herein. The transmission may include, but is not necessarily limited to a continuously variable transmission that is capable seamlessly changing between an infinite number of gear ratios between a maximum gear ratio and a minimum gear ratio. Continuously variable transmissions are well known in the art, and the specific features and operation are not described in detail herein. While the method described herein is particularly well suited for continuously variable transmissions, it should be appreciated that the method may be applied to other types of transmissions that define a discrete number of fixed gear ratios.

The method may be applied to mitigate sensitivity of the transmission to quick changes in the position of an accelerator pedal of the vehicle, such as may occur in a "change of mind event". As used herein, the term "change of mind event" is defined as an abrupt change in position of the accelerator pedal over a short period of time.

Referring to FIG. 1, the position of the accelerator pedal is shown over time during a change of mind event. As shown in FIG. 1, a position of the accelerator pedal is shown along a vertical axis 20, and time is measured along a horizontal axis 22. The position of the accelerator pedal, hereinafter referred to as the "pedal position 24" is represented by the line 24.

Referring to FIG. 1, the graph represents the change in the pedal position 24 over time. The pedal position 24 begins at a start point 26, which may occur and/or be initialized when the vehicle is started. From the start point 26, the pedal position 24 defines a first segment 28, which increases up to a first inflection point 30. As used herein, the term "inflection point" is defined as a change in direction in the movement of the accelerator pedal. The first inflection point 30 occurs at a first time 32. The increase in the pedal position 24 from the start point 26 to the first inflection point 30 corresponds to a constant depressing of the accelerator pedal, i.e., movement in a constant direction hereinafter referred to as a depressing direction, which is the direction the accelerator pedal moves when a driver depresses the accelerator pedal to increase throttle. From the first inflection point 30, the pedal position 24 defines a second segment 34, which decreases down to a second inflection point 36. The second inflection point 36 occurs at a second time 38. The decrease in the pedal position 24 from the first inflection point 30 to the second inflection point 36 corresponds to a constant release or the accelerator pedal, i.e., movement in a constant direction hereinafter referred to as a releasing direction, which is the direction the accelerator pedal moves when a driver releases the accelerator pedal to reduce throttle. The first inflection point 30 identifies the transition between the first segment 28, in which the accelerator pedal is being depressed and is being moved in the depressing direction, and the second segment 34 of the pedal position 24, in which the accelerator pedal is being released and moving in the releasing direction. In other words, the direction of travel or movement of the accelerator pedal changes at the first inflection point 30 from the depressing direction in the first segment 28 of the pedal position 24, to the releasing direction in the second segment 34 of the pedal position 24.

From the second inflection point 36, the pedal position 24 defines a third segment 40, which increases up to a third inflection point 42. The third inflection point 42 occurs at a third time 44. The increase in the pedal position 24 from the second inflection point 36 to the third inflection point 42 corresponds to a constant depressing of the accelerator pedal, i.e., movement of the accelerator pedal in the depressing direction. The second inflection point 36 identifies the transition between the second segment 34 of the pedal position 24, in which the accelerator pedal is being released and is moving in the releasing direction, and the third segment 40 of the pedal position 24, in which the accelerator pedal is being depressed and moving in the depressing direction. In other words, the direction of travel or movement of the accelerator pedal changes at the second inflection point 36 from the releasing direction in the second segment 34 of the pedal position 24, to the depressing direction in the third segment 40 of the pedal position 24.

From the third inflection point 42, the pedal position 24 defines a fourth segment 46, which decreases. The decrease in the pedal position 24 from the third inflection point 42 corresponds to a constant releasing of the accelerator pedal, i.e., movement of the accelerator pedal in the releasing direction. The third inflection point 42 identifies the transition between the third segment 40 of the pedal position 24, in which the accelerator pedal is being depressed and is moving in the depressing direction, and the fourth segment 46 of the pedal position 24, in which the accelerator pedal is being released and moving in the releasing direction. In other words, the direction of travel or movement of the accelerator pedal changes at the third inflection point 42 from the depressing direction in the third segment 40 of the pedal position 24, to the releasing direction in the fourth segment 46 of the pedal position 24. This cyclical movement between inflection points continues until the vehicle is stopped.

The vehicle may include a controller or control module, such as but not limited to a Transmission Control Unit (TCU), to control the operation of the transmission. The controller may include a computer and/or processor, and include all software, hardware, memory, algorithms, connections, sensors, etc., necessary to manage and control the operation of the transmission. As such, the method of controlling the transmission described below, may be embodied as a program operable on the controller. It should be appreciated that the controller may include any device capable of analyzing data from various sensors, comparing data, making the necessary decisions required to control the operation of the transmission, and executing the required tasks necessary to control the operation of the transmission.

The controller includes a tangible non-transitory memory having computer executable instructions recorded thereon, including a transmission control module. The controller further includes a processor that is operable to execute the transmission control module for controlling the gear ratio of the transmission.

The controller may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The method includes sensing the position of the accelerator pedal over time. The position of the accelerator pedal may be sensed with a position sensor, as is known in the art and communicated to the TCU. The position of the accelerator pedal is sensed over time to allow the TCU to detect the inflection points in the movement of the accelerator pedal, i.e., the inflection points in the pedal position 24, including but not limited to the first inflection point 30 and the second inflection point 36.

Upon detecting consecutive inflection points, e.g., the first inflection point 30 and the second inflection point 36, the TCU may then calculate an amplitude between the consecutive inflection points. For example, a first amplitude 48 between the first inflection point 30 and the second inflection point 36 is shown by reference line 48, and a second amplitude 50 between the second inflection pint and the third inflection point 42 is shown by reference line 50. Calculating the first amplitude 48 between the first inflection point 30 and the second inflection point 36 may include subtracting a position of the pedal at the second inflection point 36 from a position of the pedal at the first inflection point 30. Calculating the second amplitude 50 between the second inflection point 36 and the third inflection point 42 may include subtracting a position of the pedal at the third inflection point 42 from a position of the pedal at the second inflection point 36. The amplitude between consecutive inflection points is a positive value when the movement of the accelerator pedal changes from the depressing direction to the releasing direction, and may correspond to a power-off up shift in the gear ratio of the transmission. The amplitude between consecutive inflection points is a negative value when the movement of the accelerator pedal changes from the releasing direction to the depressing direction, and may correspond to a power-on down shift in the gear ratio of the transmission. The amplitude between consecutive inflection pints, e.g., the first amplitude 48 and the second amplitude 50, may be saved in the memory of the TCU.

A period of time between the occurrences of the consecutive inflection points is also measured. For example, the period of time between the occurrence of the first inflection point 30 at the first time 32 and the occurrence of the second inflection point 36 at the second time 38 is measured, and is shown in FIG. 1 by reference line 52. The period of time between the occurrence of the second inflection point 36 at the second time 38 and the occurrence of the third inflection pint at the third time 44 is measured, and is shown in FIG. 1 by reference line 54. The time of the occurrence of each inflection point may be measured and saved in the memory of the TCU. For example, the first time 32 of the occurrence of the first inflection point 30 may be measured by a clock of the TCU, and saved in the memory of the TCU. Similarly, the second time 38 of the occurrence of the second inflection point 36 may be measured by the clock of the TCU, and saved in the memory of the TCU. The TCU may then use the saved first time 32 and second time 38 to calculate the period of time between the first inflection point 30 and the second inflection point 36.

The TCU may then use the time period between consecutive inflection points, and the amplitude between the respective inflection points, to define an attenuation coefficient. For example, the TCU may define the attenuation coefficient based on the first amplitude 48 between the first inflection point 30 and the second inflection point 36, and the first period of time 52 between the first inflection point 30 and the second inflection point 36. The TCU may define the attenuation coefficient in any suitable manner. For example, the TCU may define the attenuation coefficient by referencing a look-up table stored in a memory of the TCU, which correlates the amplitude between the consecutive inflection points, and the measured period of time between consecutive inflection points to a value of the attenuation coefficient. An exemplary embodiment of the attenuation coefficient look-up table is shown in FIG. 2.

The attenuation coefficient is a fraction or decimal value between the values of "0" and "1", which is used to adjust a current iteration temporary gear ratio, described in greater detail below. Referring to FIG. 2, the look-up table correlates the amplitude between consecutive inflection points. As shown in FIG. 2, the amplitude between consecutive inflection pints is shown as a numerical percentage in a first or left-most column 56, and the period of time between consecutive inflection points is shown in milliseconds in a top or upper-most row 58. As can be seen in the look-up table of FIG. 2, large changes in the amplitude over shorter periods of time correlate to smaller values of the attenuation coefficient, which more greatly adjust a current iteration temporary gear ratio. In contrast, smaller changes in the amplitude over longer periods of time correlate to larger values of the attenuation coefficient, which do not adjust or only minimally adjust the current iteration temporary gear ratio. As shown in the look-up table, the values of the attenuation coefficient vary between a minimum value of 0.2, and a maximum value of 1. However, it should be appreciated that the values of the attenuation coefficient may differ from the exemplary values shown in the look-up table.

The TCU continually adjusts the gear ratio to meet the current driving demands. The TCU continuously defines or calculates a current iteration temporary gear ratio with an iterative gear ratio selection algorithm, based upon the speed of the vehicle, and the position of the accelerator pedal. The gear ratio selection algorithm iteratively calculates the current iteration temporary gear ratio, for the current speed of the vehicle and the current position of the accelerator pedal, at pre-defined time intervals. For example, the gear ratio selection algorithm may calculate the current iteration temporary gear ratio every 6.25 ms (i.e., 0.00625 sec). In transmissions with a discrete number of gear ratios, the TCU may not need to adjust the gear ratio very often. However, for a CVT, the TCU is constantly adjusting the gear ratio as the position of the accelerator pedal and the speed of the vehicle changes.

The TCU continuously defines the gear ratio that is calculated during the immediately previous iteration of the gear ratio selection algorithm as a previous iteration final output gear ratio. Accordingly, the previous iteration final output gear ratio is constantly changing, but defines a specific gear ratio at any specific point in time. The TCU continuously defines the gear ratio that is calculated during the most recent or current iteration of the gear ratio selection algorithm as a current iteration temporary gear ratio. Accordingly, the TCU redefines the previous iteration final output gear ratio and the current iteration temporary gear ratio for every iteration of the gear ratio selection algorithm.

The current iteration temporary gear ratio is the gear ratio that the TCU would normally select for the current driving conditions. For example, at the occurrence of the second inflection point 36, the TCU will select the current iteration temporary gear ratio for the transmission based on the position of the accelerator pedal at the second inflection point 36, and the speed of the vehicle at the occurrence of the second inflection point 36. The current iteration temporary gear ratio is selected in the usual manner known to those skilled in the art, based on the speed of the vehicle and the position of the accelerator pedal, and may be selected from a table the correlates the vehicle speed and pedal position 24 to the current iteration temporary gear ratio. Assuming that the current iteration temporary gear ratio, i.e., the gear ratio defined during the current iteration of the gear ratio selection algorithm, is different from the previous iteration final output gear ratio, i.e., the gear ratio defined during the immediately previous iteration of the gear ratio selection algorithm, the TCU would normally change the state of the transmission to change the gear ratio of the transmission from the previous iteration final output gear ratio, to the current iteration temporary gear ratio. Once the TCU has changed the gear ratio to the current iteration temporary gear ratio, the current iteration temporary gear ratio would become the previous iteration final output gear ratio, and the next iteration of the gear ratio selection algorithm would calculate the new value for the current iteration temporary gear ratio. However, the method of controlling the transmission described herein alters the normal operation of the transmission, by defining a current iteration final output gear ratio based on the attenuation coefficient, and instead of changing from the previous iteration final output gear ratio to the current iteration temporary gear ratio, the TCU changes from the previous iteration final output gear ratio to the current iteration final output gear ratio, and may then change to the current iteration temporary gear ratio, in order to attenuate or lessen an unnecessary, quick change in the gear ratio of the transmission in response to a change in mind event.

It should be appreciated that the TCU must continuously sense the speed of the vehicle in order to select the current iteration temporary gear ratio. The TCU may sense the vehicle speed in any suitable manner. For example, the TCU may include a speed sensor operable to sense the speed of the vehicle. Alternatively, the TCU may be in communication with some other vehicle component that calculates the speed of the vehicle, and receive the speed of the vehicle therefrom.

The TCU may then adjust the current iteration temporary gear ratio with the defined attenuation coefficient, to define the current iteration final output gear ratio. The current iteration final output gear ratio is defined by Equation 1.

$$GR_{CIFO} = GP_{PIFO} + [K_{Att} \times (GR_{CIT} - GR_{PIFO})] \quad 1)$$

Referring to Equation 1 above, wherein $GR_{CIFO}$ is the current iteration final output gear ratio of the transmission, $GR_{CIT}$ is the current iteration temporary gear ratio, and is the gear ratio that is calculated from the most recent iteration (i.e., current iteration) of the iterative gear ratio selection algorithm, $K_{Att}$ is the attenuation coefficient, and $GR_{PIFO}$ is the gear ratio calculated from the immediately previous iteration of the iterative gear ratio selection algorithm (i.e., the previous iteration final output gear ratio of the transmission).

If the value of the attenuation coefficient is defined to equal "0", then the current iteration final output gear ratio is defined to equal the previous iteration final output gear ratio, i.e., the gear ratio calculated during the immediately previous iteration of the gear ratio selection algorithm, and there is no change in the gear ratio. If the value of the attenuation coefficient is defined to equal "1", then the current iteration final output gear ratio is defined to equal the current iteration temporary gear ratio, i.e., the gear ratio calculated during the most recent iteration of the gear ratio selection algorithm. If the amplitude is small, and/or the period of time between consecutive inflection points is large, then the need to attenuate the gear ratio change in the transmission is lessened, and the attenuation coefficient may be defined to equal a value of 1 to allow the transmission to make the full gear ratio change from the previous iteration final output gear ratio to the current iteration temporary gear ratio. However, if the attenuation coefficient is defined to equal a value between "0" and "1", then the current iteration final output gear ratio will equal a value that is between the previous iteration final output gear ratio and the current iteration temporary gear ratio.

Once the current iteration final output gear ratio is defined, then the CVT controls the operation of the transmission to change the gear ratio of the transmission from the previous iteration final output gear ratio to the current iteration final output gear ratio. By changing the gear ratio to the current iteration final output gear ratio instead of the current iteration temporary gear ratio, the change in gear ratio is lessened or reduced. If the change in gear ratio was caused by a change of mind event, then the changing the gear ratio of the transmission to the current iteration final output gear ratio instead of the current iteration temporary gear ratio reduces the unnecessary movement of the transmission, and improves response and performance of the transmission. For example, if a driver quickly depresses the accelerator pedal to perform a passing maneuver, such as to the pedal position 24 shown at the first inflection point 30, and then suddenly changes their mind and releases the accelerator pedal, such as to the pedal position 24 shown at the second inflection point 36, there is no need to change the gear ratio of the transmission to correspond to the pedal position 24 at the first inflection point 30. By only changing the gear ratio to the current iteration final output gear ratio, instead of the current iteration temporary gear ratio that would otherwise be required by the pedal position 24 at the first inflection point 30, the responsiveness of the transmission is improved.

The TCU maintains the operation of the transmission in the current iteration final output gear ratio for no more than a control time period. The control time period may be defined to include any duration of time suitable to indicate a change of mind event, without unduly affecting the performance of the vehicle. In other words, the control time period allows the driver time to change their mind and reverse the movement of the pedal position 24. The control time may be variable, and be dependent upon a value of the attenuation coefficient. For example, the control time period may be defined from the exemplary Table 1 shown below, wherein different values of the attenuation coefficient are shown on the top row, and the corresponding control time periods for each different attenuation coefficient are shown on the bottom row. As is shown in Table 1, as the value of the attenuation coefficient increases from 0 to 1, the duration of the control time period decreases.

TABLE 1

| $K_{att}$ = 0.0 | $K_{att}$ = 0.2 | $K_{att}$ = 0.4 | $K_{att}$ = 0.6 | $K_{att}$ = 0.8 | $K_{att}$ = 1.0 |
|---|---|---|---|---|---|
| Time (sec) 0 sec | 2 sec | 1.5 sec | 1 sec | 0.5 sec | 0 sec |

Once the TCU has changed the gear ratio from the previous iteration final output gear ratio to the current iteration final output gear ratio, then the TCU maintains the operation of the transmission in the current iteration final output gear ratio until a new commanded gear ratio is defined, such as by change in the pedal position 24 of the accelerator pedal due to a change of mind event, or until the expiration of the control time period. If the control time period expires and the TCU has not defined a new commanded gear ratio, then the TCU controls the transmission to change the gear ratio from the current iteration final output gear ratio to the current iteration temporary gear ratio, thereby completing the required change in the gear ratio to correspond to the current pedal position 24. Accordingly, the TCU holds the gear ratio of the transmission at the current iteration final output gear ratio for only the control time period, after which the TCU completes the shift to the current iteration temporary gear ratio.

The process described above is an ongoing, continuous process, in which the attenuation coefficient is continuously re-defined for each subsequently detected inflection point in the movement of the accelerator pedal, from the calculated amplitude and the measured period of time between the most recently detected inflection point and an immediately previous inflection point. The previous iteration final output gear ratio and the current iteration temporary gear ratio for the transmission are each continuously re-defined for each iteration of the gear ratio selection algorithm, based on the position of the accelerator pedal and the speed of the vehicle at each iterative calculation. The re-defined attenuation coefficient and the re-defined previous iteration final output gear ratio are used to continuously adjust the re-defined current iteration temporary gear ratio to re-define the current iteration final output gear ratio. As such, the TCU continuously controls the operation of the transmission to change the transmission from the previous iteration final output gear ratio, i.e., the gear ratio selected during the immediately previous iteration of the gear ratio selection algorithm, to the re-defined current iteration final output gear ratio.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a transmission of a vehicle, the method comprising:
continuously sensing a position of an accelerator pedal over time, with a position sensor, to detect a first inflection point and a second inflection point in the movement of the accelerator pedal;
calculating an amplitude between the first inflection point and the second inflection point;
measuring a period of time between an occurrence of the first inflection point and an occurrence of the second inflection point;
defining an attenuation coefficient from the calculated amplitude and the measured period of time;
defining a current iteration temporary gear ratio for the transmission with an iterative gear ratio selection algorithm, in which the gear ratio calculated during the most recent iteration of the gear ratio selection algorithm is defined as the current iteration temporary gear ratio;
adjusting the current iteration temporary gear ratio with the defined attenuation coefficient to define a current iteration final output gear ratio; and
controlling the operation of the transmission to change the transmission from a previous iteration final output gear ratio to the current iteration final output gear ratio to limit excessive gear ratio changes in response to a change of mind event, wherein the gear ratio calculated during the immediately previous iteration of the gear ratio selection algorithm is defined as the previous iteration final output gear ratio.

2. The method set forth in claim 1 further comprising maintaining operation of the transmission in the current iteration final output gear ratio for no more than a control time period.

3. The method set forth in claim 2 wherein the control time period is dependent upon a value of the attenuation coefficient.

4. The method set forth in claim 2 further comprising controlling the operation of the transmission to change the transmission from the current iteration final output gear ratio to the current iteration temporary gear ratio at the expiration of the control time period.

5. The method set forth in claim 1 wherein adjusting the current iteration temporary gear ratio with the defined attenuation coefficient to define the current iteration final output gear ratio includes calculating the current iteration final output gear ratio from the Equation:

$$GR_{CIFO}=GP_{PIFO}+[K_{Att}\times(GR_{CIT}-GR_{PIFO})]$$

wherein $GR_{CIFO}$ is the current iteration final output gear ratio of the transmission, $GR_{CIT}$ is the current iteration temporary gear ratio calculated from the most recent iteration of the iterative gear ratio selection algorithm, $K_{Att}$ is the attenuation coefficient, and $GR_{PIFO}$ is the previous iteration final output gear ratio calculated from the immediately previous iteration of the iterative gear ratio selection algorithm.

6. The method set forth in claim 1 wherein defining the attenuation coefficient includes referencing a look-up table stored in a memory of a Transmission Control Unit to define the attenuation coefficient based on the calculated amplitude between the first inflection point and the second inflection point, and the measured period of time between the occurrence of the first inflection point and the second inflection point.

7. The method set forth in claim 1 wherein calculating the amplitude between the first inflection point and the second inflection point includes subtracting a position of the pedal at the second inflection point from a position of the pedal at the first inflection point.

8. The method set forth in claim 7 wherein the amplitude between the first inflection point and the second inflection point is defined as a positive value when the movement of the accelerator pedal changes from a depressing direction to a releasing direction, and wherein the amplitude between the first inflection point and the second inflection point is defined as negative value when the movement of the accelerator pedal changes from the releasing direction to the depressing direction.

9. The method set forth in claim 8 further comprising sensing the speed of the vehicle with a speed sensor.

10. The method set forth in claim 1 further comprising saving the amplitude between the first inflection point and the second inflection point in a memory of a Transmission Control Unit (TCU), saving a time of the occurrence of the first inflection point in the memory of the TCU, and saving a time of the occurrence of the second inflection point in the memory of the TCU.

11. The method set forth in claim 1 further comprising:
continuously re-defining the attenuation coefficient for each subsequently detected inflection point in the movement of the accelerator pedal, from the calculated amplitude and the measured period of time between the most recently detected inflection point and an immediately previous inflection point;
continuously re-defining the current iteration temporary gear ratio for the transmission with each iteration of the gear ratio selection algorithm, based on the position of the accelerator pedal and the speed of the vehicle;

continuously adjusting the current iteration temporary gear ratio with the re-defined attenuation coefficient to re-define the current iteration final output gear ratio;

continuously re-defining the previous iteration final output gear ratio with each iteration of the gear ratio selection algorithm; and continuously controlling the operation of the transmission to change the transmission from the previous iteration final output gear ratio to the current iteration final output gear ratio.

12. A method of controlling a continuously variable transmission of a vehicle, the method comprising:

continuously sensing a position of an accelerator pedal over time, with a position sensor, to detect a first inflection point and a second inflection point in the movement of the accelerator pedal, wherein an inflection point is defined as a change in direction in the movement of the accelerator pedal;

calculating an amplitude between the first inflection point and the second inflection point with a Transmission Control Unit (TCU);

measuring a period of time between an occurrence of the first inflection point and an occurrence of the second inflection point, with a clock of the TCU;

defining an attenuation coefficient from the calculated amplitude and the measured period of time with the TCU;

selecting a current iteration temporary gear ratio for the transmission with an iterative gear ratio selection algorithm of the TCU, in which the gear ratio calculated during the most recent iteration of the gear ratio selection algorithm is defined as the current iteration temporary gear ratio;

defining a previous iteration final output gear ratio, in which the gear ratio calculated during the immediately previous iteration of the gear ratio selection algorithm is defined as the previous iteration final output gear ratio;

calculating a current iteration final output gear ratio with the TCU from the Equation:

$$GR_{CIFO} = GP_{PIFO} + [K_{Att} \times (GR_{CIT} - GR_{PIFO})]$$

wherein $GR_{CIFO}$ is the current iteration final output gear ratio of the transmission, $GR_{CIT}$ is the current iteration temporary gear ratio calculated from the most recent iteration of the iterative gear ratio selection algorithm, $K_{Att}$ is the attenuation coefficient, and $GR_{PIFO}$ is the previous iteration final output gear ratio calculated from the immediately previous iteration of the iterative gear ratio selection algorithm; and controlling the operation of the transmission with the TCU to change the transmission from the previous iteration final output gear ratio to the current iteration final output gear ratio.

13. The method set forth in claim 12 further comprising maintaining operation of the transmission in the current iteration final output gear ratio for no more than a control time period, wherein the control time period is dependent upon a value of the attenuation coefficient.

14. The method set forth in claim 13 further comprising controlling the operation of the transmission to change the transmission from the current iteration final output gear ratio to the current iteration temporary gear ratio at the expiration of the control time period.

15. The method set forth in claim 12 wherein defining the attenuation coefficient includes referencing a look-up table stored in a memory of the TCU to define the attenuation coefficient based on the calculated amplitude between the first inflection point and the second inflection point, and the measured period of time between the occurrence of the first inflection point and the second inflection point.

16. The method set forth in claim 12 wherein calculating the amplitude between the first inflection point and the second inflection point includes subtracting a position of the pedal at the second inflection point from a position of the pedal at the first inflection point, wherein the amplitude between the first inflection point and the second inflection point is defined as a positive value when the movement of the accelerator pedal changes from a depressing direction to a releasing direction, and wherein the amplitude between the first inflection point and the second inflection point is defined as negative value when the movement of the accelerator pedal changes from the releasing direction to the depressing direction.

17. The method set forth in claim 16 further comprising sensing the speed of the vehicle with a speed sensor.

* * * * *